United States Patent
Schmitt et al.

(10) Patent No.: US 6,956,483 B2
(45) Date of Patent: Oct. 18, 2005

(54) ANIMAL CONTROL APPARATUS WITH ULTRASONIC LINK

(75) Inventors: Jerry C. Schmitt, Independence, MO (US); Jerry Schell, Chanute, KS (US)

(73) Assignee: Agri-Tech Electronics LC, Chanute, KS (US)

( * ) Notice: Subject to any disclaimer, the term of this patent is extended or adjusted under 35 U.S.C. 154(b) by 64 days.

(21) Appl. No.: 10/610,026

(22) Filed: Jun. 30, 2003

(65) Prior Publication Data

US 2004/0066298 A1 Apr. 8, 2004

Related U.S. Application Data

(60) Provisional application No. 60/392,277, filed on Jun. 28, 2002.

(51) Int. Cl.$^7$ .............................................. G08B 23/00
(52) U.S. Cl. ..................... 340/573.3; 119/721; 119/908
(58) Field of Search ........................... 340/573.3, 573.1, 340/573.4, 825.49, 825.72, 686.1, 568.1, 571; 119/720, 721, 908, 51.02; 361/232

(56) References Cited

U.S. PATENT DOCUMENTS

| | | | | |
|---|---|---|---|---|
| 5,949,350 A | * | 9/1999 | Girard et al. | 340/825.49 |
| 6,271,757 B1 | * | 8/2001 | Touchton et al. | 340/573.1 |
| 6,375,612 B1 | * | 4/2002 | Guichon et al. | 119/51.02 |
| 6,431,122 B1 | * | 8/2002 | Westrick et al. | 119/721 |
| 6,720,879 B2 | * | 4/2004 | Edwards | 340/573.3 |

* cited by examiner

*Primary Examiner*—Davetta W. Goins
(74) *Attorney, Agent, or Firm*—Hovey Williams LLP

(57) ABSTRACT

An animal control apparatus (10) with a collar based receiver (20) wirelessly linked to a stimulator (110) attached to the animal's ear. In a preferred embodiment, the receiver broadly comprises a GPS component (30); a wireless transmitter (40); a receiver processor (50); a power supply 60; and an attachment mechanism (80). The stimulator (110) broadly comprises a wireless receiver (120); a stimulation circuit (130); a stimulator processor (150); a stimulator power supply 160; and a stimulator attachment mechanism (180). The apparatus (10) is adapted to monitor an animal's location and deliver a corrective stimulus to the animal if the animal enters a restricted location.

35 Claims, 3 Drawing Sheets

US 6,956,483 B2

ANIMAL CONTROL APPARATUS WITH ULTRASONIC LINK

RELATED APPLICATIONS

The present application is a nonprovisional patent application and claims priority benefit, with regard to all common subject matter, of an earlier-filed U.S. provisional patent application titled "ANIMAL CONTROL APPARATUS WITH ULTRASONIC LINK", Ser. No. 60/392,277, filed Jun. 28, 2002. The identified earlier-filed application is hereby incorporated by reference into the present application.

BACKGROUND OF THE INVENTION

1. Field of the Invention

The present invention relates to animal control devices. More particularly, the invention relates to a GPS-based apparatus for restricting the movement of animals which includes a collar device with a location determining component and an ear device adapted to deliver a corrective stimulus.

2. Description of Prior Art

Animal owners often desire to remotely or automatically control the behavior of an animal, either as a training method or as part of a containment system. For example, farmers often wish to contain livestock in a particular area and prevent the livestock from approaching and entering other areas. One well-known method of remotely controlling the behavior of an animal is by delivering a stimulus to the animal when the animal's behavior deviates from a desired pattern of behavior. An example of a device which delivers such a stimulus is an animal collar adapted to deliver an electrical shock or an acoustical stimulus to the animal.

Use of such collars as part of a containment system may be automated by including a Global Positioning System (GPS) receiver and memory element thereon. The memory element is adapted to store map or location information relating to a boundary or a restricted area. Such collars are adapted to determine a location by using information from the GPS receiver and the map or location information. If the animal wearing the collar approaches or enters a restricted area, the collar delivers a corrective stimulus, such as an electrical shock or an acoustical stimulus, thus motivating the animal to leave the restricted area.

These GPS-based control devices often include a GPS receiver and associated hardware; a computing means, such as a processor; memory hardware to implement the memory element; and a power source capable of providing power to the various other components of the device for extended periods of time. The combined weight of these components can dictate the location and manner in which the device can be attached to the animal. Furthermore, the GPS receiver requires a clear view of the sky in order to properly receive GPS signals from the orbiting GPS satellites. Thus, GPS-based control devices have been largely limited to collars, which places the weight of the device where the animal can tolerate it and gives the GPS receiver an adequate view of the sky necessary for effective GPS reception.

While a collar is adequate to support the GPS device, it does not place the device in an optimal position to deliver the stimulus. The acoustical stimulus, for example, may originate several feet from the animal's ear, significantly limiting its effectiveness. Furthermore, probes mounted on a collar to deliver an electrical stimulus, such as an electrical shock, may not make good contact with the animal's skin, limiting the intensity of the stimulus. Even if the probes make good contact with the skin on the animal's neck, that skin may not be sufficiently sensitive to the shock for the stimulus to be effective. Finally, probes located on a collar may cause irritation or injury to the animal's skin, especially if the probes frequently rub the skin as a result of collar movement. For these reasons it is desirable to locate the stimulator portion of the GPS-based control device in another location on the animal, preferably a location where the stimuli will have the greatest effect without causing the animal unwanted irritation or injury. One such location is the animal's ear. Ear tags are commonly used on cattle for identification, and could be adopted for use as stimulators. Unfortunately, however, an animal's ear is not strong enough to support the weight of the entire GPS-based device.

Another disadvantage of current control devices is that they require a user to place a collar on each animal the user wishes to control. Because GPS devices are expensive, a system that requires a collar on each animal is very costly.

Due to the above-mentioned and other problems and disadvantages in the art, a need exists for an improved apparatus capable of automatically, efficiently, and effectively delivering a corrective stimulus to a group of animals when the animals enter a restricted area.

SUMMARY OF THE INVENTION

The present invention overcomes the above-described and other problems and disadvantages in the prior art by providing an animal control apparatus that uses an ultrasonic link between a locator portion and a stimulator portion, thereby allowing the stimulator portion to be placed on the animal separately from the locator portion and further allowing one locator to communicate with multiple stimulators.

The apparatus of the present invention is adapted to control an animal's behavior by monitoring the animal's behavior and delivering a corrective stimulus to the animal if the behavior deviates from a desired behavior pattern. In use, the apparatus may be used to prevent animals, such as a herd of cattle, from entering a restricted area by monitoring the herd's location and delivering the corrective stimulus to the cattle when they approach or enter the restricted area.

The apparatus comprises two portions: a locator and a stimulator, which are coupled via a wireless or wired communications link allowing them to be worn on separate parts of the animal's body. The apparatus may be used with only one animal by placing both the locator and the stimulator on the animal, or may be used with multiple animals by placing the locator and the stimulator on one animal in a group of animals and placing only a stimulator on each of the other animals of the group. Alternatively, the apparatus may be used with multiple animals by placing locators on several animals of the group.

The locator is preferably placed on the animal's neck and in one embodiment comprises a GPS component; a wireless transmitter; a locator processor, including a memory element and a timer; a locator power supply; a locator housing; and a receiver attachment mechanism, such as a collar.

The GPS component is adapted to provide, in a substantially conventional manner, geographic location information for the apparatus based on signals received from three or more members of an array of orbiting satellites. The wireless transmitter is adapted to transmit a wireless signal to the stimulator. The processor is adapted to receive and process information from the GPS component and to communicate information to the wireless transmitter. The processor may include a timer element adapted to monitor time and a memory element adapted to receive information from the processor, store the information, retrieve the information, and communicate retrieved information to the processor. The locator power supply provides power to the various other components of the locator. The locator housing is adapted to enclose and contain other components of the locator so as to protect and shield them from the hazards of use and of the environment. The locator attachment mechanism is adapted to secure, retain, and maintain the locator housing in close physical association with the animal.

The stimulator is preferably placed on one or more animals' ears and in one embodiment comprises a wireless receiver; a stimulation circuit including a stimulation delivery component; a stimulator processor including a memory element and a timer; a stimulator power supply, including a large supply and a small supply; a stimulator housing; and a stimulator attachment mechanism.

The wireless receiver is adapted to receive a wireless signal generated by the wireless transmitter and to communicate the signal to the stimulator processor. The stimulation circuit is adapted to receive a stimulation delivery signal and deliver a corrective stimulus to the animal via a stimulation delivery component. The stimulation delivery component includes an electric component and an acoustic component, and may deliver a stimulus via the electric component, the acoustic component, or both. The stimulation delivery component may deliver a predetermined stimulus automatically upon receiving a stimulation delivery signal, or may determine a type of stimulus to deliver depending on the information contained in the stimulation delivery signal. The stimulator processor is adapted to receive a stimulation request signal from the wireless receiver; determine if a stimulation delivery signal needs to be communicated to the stimulation circuit and what information a stimulation delivery signal needs to contain; and communicate the stimulation delivery signal to the stimulation circuit. The stimulator processor may include a memory element and a timer. The stimulator power supply provides power to the various other components of the stimulator and is separated into two portions. The stimulator housing is adapted to enclose and contain other components of the stimulator so as to protect and shield them from the hazards of use. The stimulator attachment mechanism is adapted to secure, retain, and maintain the stimulator in close physical association with the animal and may provide a contact point with the animal for stimulation delivery.

Thus, the apparatus of the present invention is divided into two wirelessly cooperating portions: the locator and the stimulator. Using two cooperating portions provides several advantages which overcome the limitations of the prior art. For example, it allows the weight of the components to be spread out over the animal's body and placed where the animal can best support them. Furthermore, it allows a single locator to be used with a plurality of stimulators.

In a preferred implementation the animal control apparatus is used with a group of animals, such as a herd of cattle, to keep them from entering a restricted area. The restricted area may be, for example, a field, a residential area, a road, or a barn. Applicant has discovered that the location of one animal often determines, or is indicative of, the location of the entire group because animals tend to travel in groups and are often led by a single dominant animal. Thus, one locator may be attached to the neck of a bull or a dominant cow in the herd, whereas a stimulator is attached to an ear of each animal in the herd, including the animal that is wearing the locator. As the dominant animal approaches or enters a restricted area, the locator requests a corrective stimulus via the ultrasonic link and the stimulator responds by delivering a corrective stimulus to the dominant animal. Any other animal with a stimulator that is within the range of the wireless transmitter of the locator on the dominant animal also receives a corrective stimulus. Thus, one locator may be used as part of a system that prevents the entire herd from entering a restricted area.

The apparatus may implement a stimulation limit function, including a primary stimulation limit function and a secondary stimulation limit function. The primary stimulation limit function may be implemented in the stimulator and use a lower stimulation threshold to prevent quick repetitions of stimuli. The secondary stimulation limit function may be implemented in the locator and use a higher stimulation threshold to terminate long periods of repeated stimulation. The stimulation limit would allow the animal or animals time to exit a restricted area and would protect animals from excessive stimulations when the animal was incapable of returning to an unrestricted area.

The locator processor receives location information from the GPS component and compares it with the boundaries of the restricted area. If the apparatus is within the restricted area, the locator processor communicates a stimulation request signal to the transmitter, which transmits an ultrasonic stimulation request signal which may be encoded to avoid false stimuli. Encoding the request signal may further allow the stimulators to distinguish between each locator in a multiple locator system.

After communicating a stimulation request signal, the locator processor determines if the secondary stimulation limit needs to be applied. The processor may, for example, monitor the total number of stimuli delivered and stop transmitting stimulation request signals by entering a disabled state if the number of requests exceeds the limit. The processor may remain in the disabled state until a user re-enables it, setting the number of stimuli delivered to zero.

The wireless receiver of the stimulator receives an ultrasonic signal transmitted by the wireless transmitter of the locator and communicates the signal to the stimulator processor. The stimulator processor attempts to decode the signal and enters a stimulation phase upon a successful decode. When the stimulator processor enters the stimulation phase, it determines a type of stimulus to deliver and implements the primary stimulation limit function.

The apparatus enters the stimulation phase by first delivering an acoustic stimulus and determining if a stimulation history calls for an electrical stimulus. A stimulation history may call for an electrical stimulus if it indicates that the animal did not respond to an initial acoustic stimulus, or that several acoustic stimuli have been delivered. After communicating the stimulation request signal, or if the stimulator processor determines that an electrical stimulus is not necessary, it updates the stimulation history and implements the primary stimulation limit function. The primary stimulation limit function preferably includes both a short quiet period that is automatically implemented after the delivery of each stimulus, and a long quiet period that is implemented if the number of stimuli delivered during a predetermined time exceeds a specified stimulus limit.

These and other important features of the present invention are more fully described in the section titled DETAILED DESCRIPTION OF PREFERRED EMBODIMENTS, below.

DETAILED DESCRIPTION OF PREFERRED EMBODIMENTS

Figure 1:
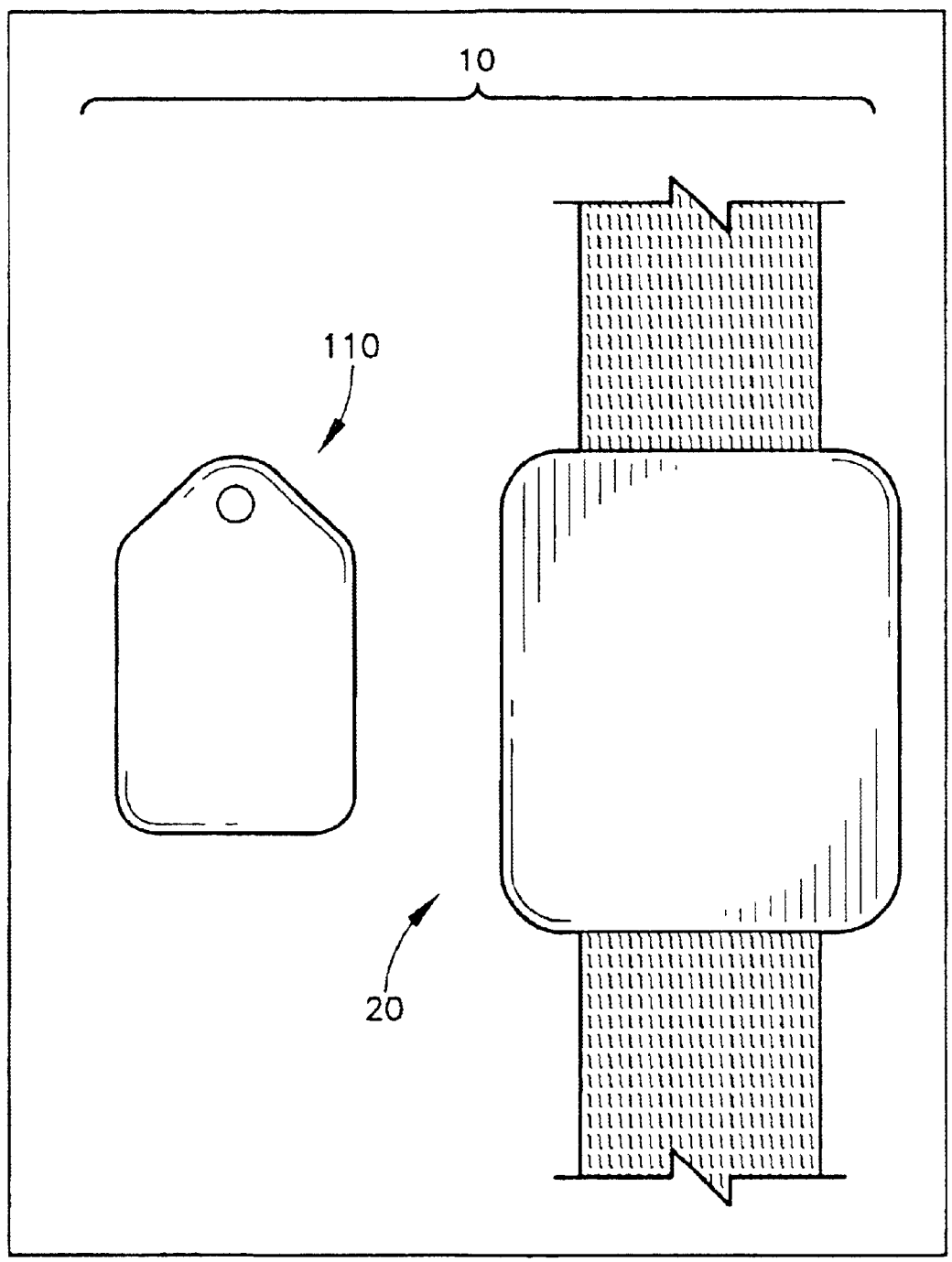
FIG. 1 is a plan view of a preferred embodiment of the apparatus of the present invention depicting a locator and a stimulator.

Referring to FIG. 1, an animal control apparatus 10 is shown constructed in accordance with a preferred embodiment of the present invention. The apparatus 10 is adapted to control an animal's behavior by monitoring the animal's behavior and delivering a corrective stimulus to the animal if the behavior deviates from a desired behavior pattern. In use, the apparatus 10 may be used to prevent an animal or group of animals from entering a restricted area by monitoring the animals' location and delivering the corrective stimulus to the animals when the animal approaches or enters the restricted area.

The apparatus 10 comprises two portions, a locator 20 and a stimulator 110. In one embodiment, the locator 20 and the stimulator 110 are coupled via a wireless communications link, allowing them to be worn on separate parts of the animal's body. The apparatus 10 may be used with only one animal by placing both the locator 20 and the stimulator 110 on the animal, or may be used with multiple animals by placing the locator 20 and the stimulator 110 on one animal in a group of animals and placing only a stimulator 110 on each of the other animals of the group. If the apparatus 10 is used with multiple animals, the locator 20 is preferably placed on a dominant animal that is indicative of or determines the location of the entire group of animals. The apparatus 10 may also be used with multiple animals by placing multiple locators 20 on multiple animals of the group, wherein the animals wearing the locators 20 are indicative of or determine the location of the entire group of animals.

Figure 2:
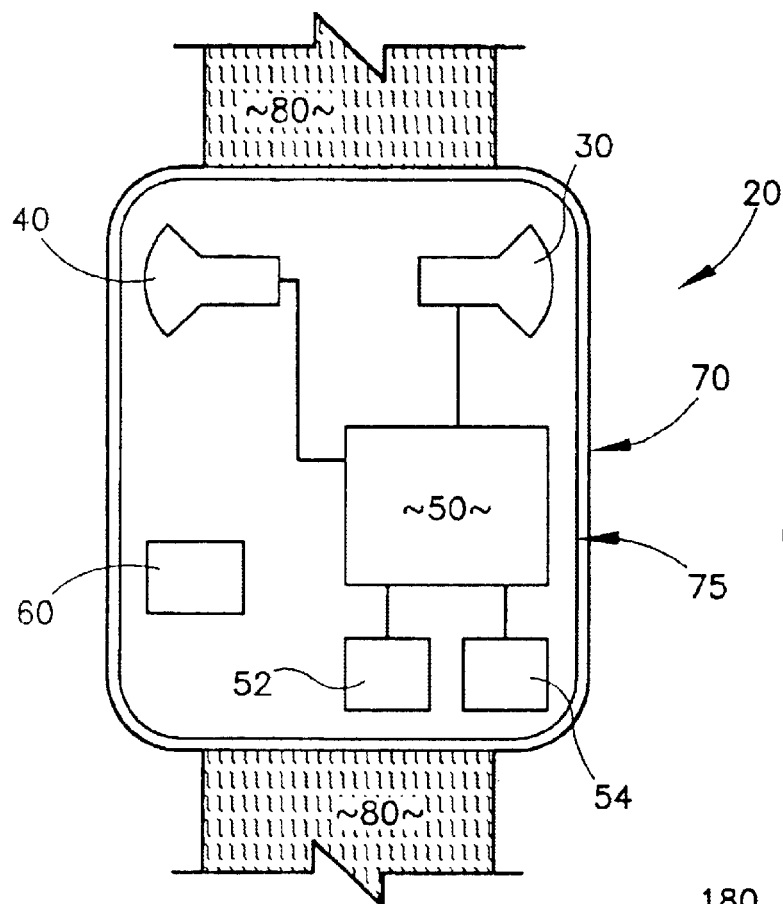
FIG. 2 is a schematic of components of the locator of the apparatus of FIG. 1.

Referring also to FIG. 2, a more detailed illustration of the locator 20 is shown. The locator 20 further comprises a GPS component 30; a wireless transmitter 40; a locator processor 50, including a memory element 52 and a timer 54; a locator power supply 60; a locator housing 70; and a locator attachment mechanism 80.

The GPS component 30 is adapted to provide, in a substantially conventional manner, geographic location information for the apparatus 10 based on signals received from three or more members of an array of orbiting satellites. This location information is provided to the locator processor 50. Although the GPS component 30 has been described, other methods may be used to determine the location of the locator 20. The locator 20 may include, for example, an RF receiver or an ultrasonic receiver in conjunction with a local location determining system.

The wireless transmitter 40 is adapted to transmit a wireless signal to the stimulator 110. The wireless transmitter 40 is preferably adapted to transmit an ultrasonic signal, but may be adapted to transmit any type of wireless communication signal, such as an RF, infrared, or other electromagnetic signal. The transmitter 40 preferably has a range of between 10 and 25 feet, but may have a larger range as the need arises, such as when the transmitter 40 needs to reach a large or disparate group of animals; or may have a shorter range, such as when the apparatus 10 is used with only one animal.

The locator processor 50 is adapted to receive and process information from the GPS component 30 and to communicate information to the wireless transmitter 40. The processor 50 may be, for example, a microcontroller. The processor 50 may include one or more timer elements 54 adapted to measure time, and a memory element 52 adapted to store information.

The timer element 54 may be integral with or separate from the processor 50, and preferably measures time in a conventional manner, such as, for example, a free-running counter operable to communicate a counter value at a given time. In addition to the timer element 54, the locator processor 50 preferably contains a watchdog timer integral therewith (not shown), wherein the watchdog timer is operable to function independently of the processor 50 and to detect program execution faults, reset the system, and cause the processor 50 to change from a "sleep" mode to an "active" mode.

The memory element 52 is adapted to store information and may, for example, receive information from the processor 50, store the information, retrieve the information, and communicate retrieved information to the processor 50. The memory element 52 may include several subelements, such as an electrically erasable programmable read-only memory (EEPROM), a static random access memory (SRAM), a Flash memory, or a register. Furthermore, the subelements may be integral with or separate from the processor 50. The processor 50 is preferably adapted to communicate stimulation history information to the memory element 52, wherein the information relates to previously requested stimuli, such as the total number of stimuli requested, or the number of stimuli requested over a given period of time. The stimulation history may be, for example, a running number of stimuli requested, and may be stored in a register internal to the processor 50.

The locator power supply 60 provides power to the various other components of the locator 20. Preferably the power supply 60 is in the form of a battery, whether rechargeable or non-rechargeable. The power supply 60 may further include one or more solar cells, adapted to recharge the battery or supply power to the locator 20 concurrently with the battery, thus extending the period of time over which the locator 20 may operate without replacing or recharging the battery.

The locator housing 70 is adapted to enclose and contain other components of the locator 20 so as to protect and shield them from the hazards of use (e.g., jostling, dropping, other mechanical shock) and of the environment (e.g., rain, dust). Livestock, for example, tend to rub against trees, roll on the ground, scuffle with other animals, and submerge themselves in water. Thus, the housing 70 needs to be sufficiently durable to avoid breaking and sufficiently sealed to prevent water from seeping in. Therefore, the receiver housing 70 is preferably constructed from a suitable lightweight and impact-resistant material such as, for example, plastic, nylon, aluminum, or any combination thereof. Additionally, the receiver housing 70 preferably includes one or more appropriate gaskets or seals 75 to make it substantially waterproof or resistant. Though shown as being substantially rectangular, the receiver housing 70 may take any suitable shape, including, for example, ergonomic shapes molded to substantially correspond to a portion of the animal's body (e.g., neck, leg, back) whereupon or against which the housing 70 is meant to rest.

The locator attachment mechanism 80 is adapted to secure, retain, and maintain the receiver housing 70 in close physical association with the animal. The attachment mechanism 80 is preferably a collar, but may be anything adapted to secure the housing 70 to a portion of the animal that is tolerant of the weight of the locator 20. The attachment mechanism 80 must also be durable enough to secure the housing 70 against the stresses of animal activity for days, weeks or even months at a time. Thus, the attachment mechanism 80 needs to be sufficiently durable to avoid breaking, and be adapted to retain the housing 70 in a safe position. Furthermore, the attachment mechanism 80 is preferably adjustable, using, for example, a conventional buckle type mechanism.

Figure 3:
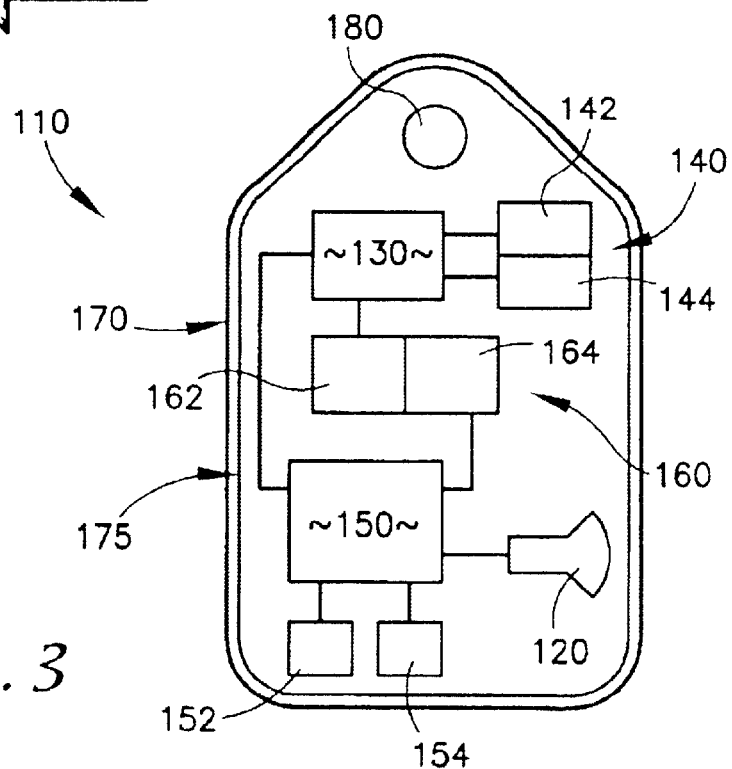
FIG. 3 is a schematic of components of the stimulator of the apparatus of FIG. 1.

Referring also to FIG. 3, the stimulator 110 further comprises a wireless receiver 120; a stimulation circuit 130 including a stimulation delivery component 140 with an acoustic component 142 and an electric component 144; a stimulator processor 150, including a memory element 152 and a timer 154; a stimulator power supply 160, including a large supply 162 and a small supply 164; a stimulator housing 170; and a stimulator attachment mechanism 180.

The wireless receiver 120 is adapted to receive a wireless signal generated by the wireless transmitter 40 and to communicate the signal to the stimulator processor 150. The wireless receiver 120 is preferably connected to an external interrupt of the processor 150, allowing the processor 150 to be awakened from a sleep mode by a communication from the receiver 120. The wireless signal is preferably an ultrasonic signal but may be any signal adapted to travel through a wireless medium, including an electromagnetic signal. Thus, the wireless transmitter 40 and the wireless receiver 120 form an ultrasonic link between the locator 20 and the stimulator 110. The transmitter 40 and the receiver 120 may include, for example, ceramic resonators adapted to produce and to receive the ultrasonic signal, respectively. In order to ensure matched frequencies between the ceramic resonators, the transmitter 40 may include an oscillator whose frequency is determined by the frequency of the ceramic element of the transmitter 40. This configuration allows the transmission frequency of the transmitter 40 to vary according to a change in frequency of the ceramic resonators due to a change in temperature. Because the frequencies of the resonators vary similarly according to temperature, the transmitter 40 and the receiver 120 will have matching frequencies over a broad range of temperatures.

The stimulation circuit 130 is adapted to receive a stimulation delivery signal and deliver a corrective stimulus to the animal via a stimulation delivery component 140. The stimulation delivery component 140 is adapted to deliver a corrective stimulus to the animal to elicit a change in the animal's behavior. The stimulus may be delivered, for example, when the animal has moved into a restricted area. In that case, the stimulus would be intended to motivate the animal to leave the area. The stimulation delivery component 140 includes an acoustic component 142 and an electric component 144. Power to the stimulation circuit 130 may be turned off entirely while the stimulation circuit 130 is not active to preserve the life of the power supply 160.

The acoustic component 142 may include a speaker, wherein an audible stimulus is delivered to the animal through the speaker. The audible stimulus may be, for example, a sound that is alarming or irritating to the animal. The stimulation circuit 130 may deliver a stimulus via the acoustic component 142, the electric component 144, or both. The stimulation circuit 130 may deliver a predetermined stimulus automatically upon receiving the stimulation delivery signal, or may determine a type of stimulus to deliver depending on the information contained in the stimulation delivery signal. The electric component 144 is preferably adapted to deliver an electrical shock to the animal and may include, for example, a capacitor and a probe. The stimulation circuit 130 would charge the capacitor and connect it to the probe in order to deliver the electrical shock. The stimulation delivery component 140 may have only one stimulation means, such as only the electric component 144, or may have two or more stimulation means. Furthermore, the stimulation delivery component 140 may have stimulation means other than those described above, such as a vibrating component.

The stimulator processor 150 is adapted to receive a stimulation request signal from the wireless receiver 120; determine if a stimulation delivery signal needs to be communicated to the stimulation circuit 130 and what information a stimulation delivery signal needs to contain; and communicate the stimulation delivery signal to the stimulation circuit 130. The stimulator processor 150 may be, for example, a microprocessor. The stimulator processor 150 may include a memory element 152 and one or more timers 154. The memory element 152 is adapted to store information and may be substantially similar to the memory element 52 of the locator processor 50, described above. The processor 150 is preferably adapted to communicate stimulation history information to the memory element 152, wherein the information relates to previously delivered stimuli, such as a total number of stimuli delivered, or a number of stimuli delivered over a given period of time. The timer 154 is adapted to measure time in a conventional manner.

The wireless receiver 120 is preferably connected to the processor 150 in a way which allows the processor 150 to remain in a low-powered "sleep" mode until a signal is received. This may be done, for example, by connecting the wireless receiver 120 to an external interrupt input of the processor 150, wherein asserting the interrupt input forces the processor 150 from a sleep mode to an active mode. Allowing the processor to enter the sleep mode when not processing stimulation information preserves energy and extends the life of the stimulator power supply 160. There may be several different sleep modes available to the stimulator processor 150, wherein sleep modes requiring less power may be used when stimulation requests are more infrequent.

The stimulator power supply 160 provides power to the various other components of the stimulator 110. Preferably the stimulator power supply 160 is in the form of a battery, whether rechargeable or non-rechargeable. Batteries with high energy-to-weight ratios are preferred, such as Lithium batteries, to enable the power supply 160 to provide power to the stimulator 110 over long periods of time while minimizing the overall weight of the stimulator 110. The stimulator power supply 160 includes a large supply 162 and a small supply 164, wherein the large supply 162 provides power to the stimulation circuit 130 and the small supply 164 provides power to the remaining components of the stimulator 110.

Separating the stimulator power supply 160 into two portions presents two advantages. First, it isolates the stimulation circuit 130 from the power source of the other components of the stimulator 110, protecting the other components from supply voltage reduction during the stimulation periods, which may require a large amount of current. Second, it allows the size of the portions of the power supply 160 to correspond to the power requirements of the components they supply. The stimulation circuit 130 may require more power than the remaining components, requiring a particularly large amount of power during stimulation periods. In use, the stimulation circuit 130 may consume several milliamps of current while the wireless receiver 120 and the processor 150 together may consume only several microamps of current. Thus, separating the power supply into two portions may allow the stimulator 110 to operate more efficiently.

The stimulator housing 170 is adapted to enclose and contain other components of the stimulator 110 so as to protect and shield them from the hazards of use, and may be similar in construction and material to the receiver housing 70. Though shown as being substantially rectangular, the stimulator housing 170 may take any suitable shape, including, for example, ergonomic shapes molded to substantially correspond to a portion of animal's body (e.g., neck, leg, back) whereupon or against which the stimulator housing 170 is meant to rest.

The stimulator attachment mechanism 180 is adapted to secure, retain, and maintain the stimulator 110 in close physical association with the animal and may provide a contact point with the animal for stimulation delivery. The stimulator attachment mechanism 180 is preferably adapted to attach the stimulator 110 to an ear of the animal, but may be adapted to attach the stimulator 110 to any part of the animal's body that will be sensitive to stimulation. Furthermore, the stimulator attachment mechanism 180 must be durable enough to secure the stimulator housing 170 against the stresses of animal activity for days, weeks or even months at a time.

The stimulator attachment mechanism 180 may be combined with the stimulation circuit 130 to deliver a corrective stimulation at a point of attachment. The electrical component 144 may, for example, be a part of the attachment mechanism 180 that is in continuous contact with the animal's skin, so that electrical shocks are effectively delivered to the animal without a need for a separate probe. In use, the point of attachment may be on the ear of a cow or bull, which would provide a sufficiently sensitive point of contact for the electric component and would position the acoustic component for optimal stimulus delivery.

Thus the apparatus 10 is divided into two wirelessly cooperating portions: the locator 20 and the stimulator 110. Using two cooperating portions gives the present invention several advantages which overcome the limitations of the prior art. First, it allows the weight of the components to be spread out over the animal's body. The locator 20, for example, which may be heavier than the stimulator 110, may be attached to the animal's neck using a collar. The lighter stimulator 110 may then be attached to the animal's ear where stimulation is more effective. This is advantageous because the ear may not be strong enough to tolerate the weight of an entire animal control apparatus 10, making use of a single, integrated apparatus less effective.

A second advantage of using two wirelessly cooperating portions is that it allows a single locator 20 to be used with a plurality of stimulators 110. Not only can this make the system more effective, but it can reduce the cost of using the apparatus by allowing a user to attach one locator 20 to a dominant animal in a group of animals and attach a stimulator 110 to each of the animals in the group, eliminating the need to attach a locator 20 to each animal.

In a preferred implementation the animal control apparatus 10 is used with a group of animals, such as a herd of cattle, to keep them from entering a restricted area. The restricted area may be, for example, a field, a residential area, a road, or a barn. The receiver attachment mechanism 80 comprises a collar adapted to attach the receiver housing 70 to the neck of a bull or a dominant cow in the herd. A stimulator 110 is attached to an ear of each animal in the herd, including the animal that is wearing the locator 20. Thus, a user may control the group of animals using only one locator 20 and a plurality of stimulators 110. This is particularly useful where there is a dominant animal in the group that determines, or is indicative of, the movement of the group, such as a bull with a group of cows. As the dominant animal approaches or enters a restricted area, the locator 20 requests a corrective stimulus via the ultrasonic link and the stimulator 110 responds by delivering a corrective stimulus to the dominant animal. Any other animal with a stimulator 20 that is within the range of the wireless transmitter 40 of the locator 20 on the dominant animal also receives a corrective stimulus. Thus, one receiver may be used as part of a system that prevents the entire herd from entering a restricted area.

The preferred implementation is described as having one locator 20 and a plurality of stimulators 110, but any number of locators 20 and stimulators 110 may be used. For example, if there is not one dominant animal in the group, it may be necessary to attach a locator 20 to two or three different animals in the group that tend to determine or indicate the location of the entire group. If multiple locators 20 are used simultaneously in the same area, it may be desirable to enable the stimulators 110 to distinguish between the stimulation request signals of each locator 20, as discussed below.

The apparatus 10 may implement a stimulation limit function, including a primary stimulation limit function and a secondary stimulation limit function. The primary stimulation limit function may be implemented in the stimulator processor 150 and use a lower stimulation threshold to prevent quick repetitions of stimuli. The secondary stimulation limit function may be implemented in the locator processor 50 and use a higher stimulation threshold to disable the locator processor 50 after a predetermined number of stimulations. The purpose of the stimulation limit is to give the animal or animals time to exit a restricted area. The stimulation limit would also protect an animal from overstimulation if the animal becomes injured, lost, or otherwise is incapable of returning to an unrestricted area, or if the apparatus 10 malfunctions.

The locator 20 monitors its geographic location. The locator processor 50 receives location information from the GPS component 30 and compares it with the boundaries of the restricted area, which are stored in the memory element 52. If the apparatus 10 is within the restricted area, the locator processor 50 communicates a stimulation request signal to the transmitter 40, which transmits an ultrasonic stimulation request signal. In order to avoid false stimuli and to allow the stimulators 110 to distinguish between each locator 20 in a multiple locator system, the locator processor 50 is adapted to encode the ultrasonic transmission. The processor 50 may encode the transmission by transmitting, for example, a series of six ultrasonic signal cycles, wherein each cycle is 1.5 seconds in duration and consists of alternating 0.125 second "on" and "off" states. Each stimulator 110 may decode the signal, for example, by looking for two consecutive cycles of the encoded signal. Requiring the stimulators 110 to decode the stimulation request signal by looking for a pattern or series of patterns reduces the risk of the stimulator 110 falsely detecting a signal.

To avoid overstimulation due to the repetitive nature of the signal encoding, it may be necessary to adapt the stimulator 110 is to recognize multiple successive cycles as only one stimulation request, as described below. If multiple locators 20 are used simultaneously in the same area, each locator 20 may have a unique signal encoding scheme to allow the stimulators 110 to recognize the source of a stimulation request signal and use that information in determining the type of stimulation to deliver. For example, unique encoding schemes would allow a stimulator 110 to reject a stimulation request from a second locator 20 if it recently received a stimulation request from a first locator 20.

After communicating a stimulation request signal the locator processor 50 determines if the secondary stimulation limit needs to be applied. The processor 50 may, for example, monitor the total number of stimuli delivered and stop transmitting stimulation request signals if the number of requests exceeds the limit. The processor 50 may monitor the number of stimuli delivered by incrementing a counter each time a stimulus is delivered and comparing the value of the counter to the limit. When the counter value equals the limit, the processor 50 may stop transmitting stimulation request signals by, for example, entering a disabled state. The processor would remain in the disabled state until a user re-enabled it. Upon being re-enabled the processor 50 would set the counter value to zero to begin counting the stimuli from zero.

The user may re-enable the processor using a control device, such as a hand-held control device adapted to communicate with the locator 20 via an RF link and to enable and disable the processor 50. For example, a farmer or other user may carry the hand-held control device and use it to re-enable a disabled locator 20 when the animal wearing the locator 20 has left a restricted area.

The wireless receiver 120 receives an ultrasonic signal transmitted by the wireless transmitter 40 and communicates the signal to the stimulator processor 150. The processor 150 tests the signal by attempting to decode it. The decoding process may include, for example, detecting two consecutive signal cycles. Once the processor 150 recognizes two cycles it enters a stimulation phase. If the processor 150 does not successfully decode a stimulation signal, it may wait for another stimulation request signal or return to a sleep mode. The decoding function need not be performed by the processor 150, but may be performed by an electrical circuit separate from the processor. Separating the decode circuitry from the processor 150 has the advantage of allowing the processor 150 to remain in a sleep mode until a stimulation request signal has been successfully decoded.

When the stimulator processor 150 enters the stimulation phase, it determines a type of stimulus to deliver and implements the primary stimulation limit function. It may determine the type of stimulus to deliver based on a number of factors, including a number of stimuli delivered over a recent period of time and the type of stimulus most recently delivered.

Figure 4:
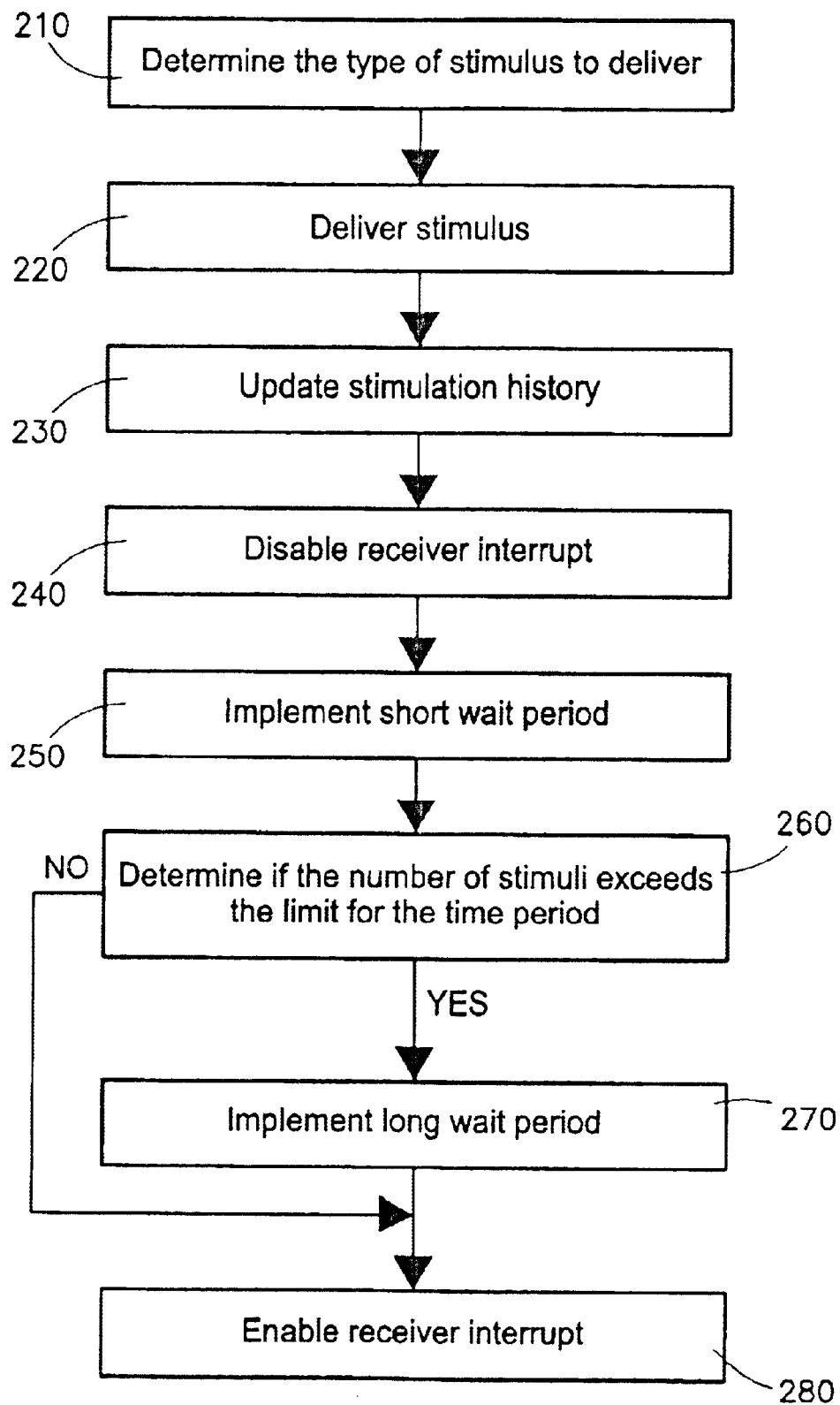
FIG. 4 is a flowchart of steps involved in a stimulation process implemented by the stimulator of the apparatus of FIG. 1.

Referring also to FIG. 4, the apparatus 10 may enter the stimulation phase by first determining a type of stimulus or stimuli to deliver, as depicted in block 210. A stimulation history may call for an electrical stimulus if it indicates that the animal did not respond to an initial acoustic stimulus, or that several acoustic stimuli have been delivered. If there has only been one non-recent previous stimulus, for example, the stimulator processor 150 may determine that an acoustic stimulus is sufficient. If there has been a recent stimulus, or multiple non-recent stimuli, the stimulator processor 150 may determine that an electrical stimulus is necessary. When the stimulator processor 150 determines the type of stimulus to deliver, it delivers the stimulus to the animal, as depicted in block 220, by communicating a stimulation request signal to the stimulation circuit 130.

The processor 150 may determine a type of stimulus to deliver by using a stimulus counter that is periodically decremented. Each time the processor 150 communicates a stimulation delivery signal it increments the counter. The processor 150 periodically decrements the counter by using, for example, the timer 154 to measure time periods and decrementing the counter at the end of each time period. If the rate at which stimulation request signals are being communicated exceeds the rate at which the counter is decremented, the counter value gradually increases. If the rate at which the counter is decremented exceeds the rate at which stimulation request signals are being communicated, the counter value gradually decreases. If the counter value is zero, the processor 150 may deliver only an acoustic stimulus. If the counter value is one, the processor 150 may deliver an acoustic stimulus and an electric stimulus. If the counter value is two or more, the processor 150 may deliver two electric stimuli.

After delivering the stimulus the stimulator processor 150 updates the stimulation history, as depicted in block 230. The processor 150 may update the stimulation history by storing in the memory element 152 information relating to the type of stimulus and the time the stimulus was delivered. This may be done, for example, by incrementing the stimulus counter described above.

After updating the stimulation history, the processor 150 implements the primary stimulation limit function. The primary stimulation limit function preferably includes both a short stimulation quiet period that is automatically implemented after the delivery of each stimulus, and a long stimulation quiet period that is implemented if the number of stimuli delivered during a predetermined time exceeds a specified stimulus limit.

The stimulator processor 150 implements the primary stimulation limit function by first disabling the receiver interrupt, as depicted in block 240. Disabling the receiver interrupt causes the processor 150 to ignore stimulation request signals. After disabling the interrupt, the stimulator processor 150 implements the short wait period, as depicted in block 250. This may be done, for example, by initializing the timer 154, starting the timer 154, and waiting until it reaches a certain value. The wait period corresponds in length to the short quiet period. The short quiet period prevents multiple repeated stimuli from the same locator 20. Furthermore, in a system with multiple locators 20 the short quiet period prevents multiple stimuli from different locators.

After the short wait period the processor 150 determines if the long quiet period needs to be implemented by determining if the number of stimuli delivered over a particular time period exceeds the limit, as depicted in block 260. If the number of stimuli does not exceed the limit, the processor 150 enables the receiver interrupt as depicted in block 280, thus completing the short quiet period and not observing a long quiet period.

The stimulator processor 150 implements the long quiet period if a predetermined number of stimuli are delivered in a predetermined time period. The stimulator processor 150 may determine how many stimuli have been delivered in a given period using the stimulus counter described above. The processor 150 may determine that the number of stimuli has exceeded a limit if the counter reaches a particular value, at which time the processor 150 implements the long wait period as depicted in block 270, by not sending stimulation request signals until the value of the counter decreases to an acceptable value. If the value of the counter does not exceed the stimulus limit, the processor 150 enables the receiver interrupt as depicted in block 280, thus completing the long quiet period.

The stimulator processor 150 may also be adapted to use the stimulus counter to determine when the processor 150 should enter a sleep mode by, for example, entering a sleep mode when the counter is decremented to zero. Furthermore, implementation of the quiet periods need not depend on elapsed time or total number of stimuli delivered over a specified time period, as explained above. The quiet periods may depend on other factors, such as total number of stimuli delivered in a geographic area or total number of stimulation request signals received from a particular locator 20.

In an alternative embodiment, the locator 20 and stimulator 110 communicate via a wired connection rather than a wireless connection. In this embodiment, the wireless transmitter 40 of the locator 20 and the wireless receiver 120 of the stimulator 110 would be replaced with wired components.

This alternate embodiment is not presently preferred because it has the disadvantage of being susceptible to damage. For example, the transmission wire may get caught on trees, brush, fences, or other animals, which may break or strain the wire. Another problem is that the wire must be connected to each portion of the device via external connectors, which increases the risk of moisture entering the device, especially when the wire is strained or the connector is not sealed well.

Although the invention has been described with reference to the preferred embodiments illustrated in the attached drawings, it is noted that equivalents may be employed and substitutions made herein without departing from the scope of the invention as recited in the claims. It will be appreciated, for example, that the apparatus 10 is not limited to use with cattle but may also be used with other animals such as, for example, sheep or pigs.

Having thus described the preferred embodiment of the invention, what is claimed as new and desired to be protected by Letters Patent includes the following:

1. An animal control apparatus comprising:
    a locator adapted to be worn by the animal, the locator including
        a first processor operable to determine its location and to generate a signal if the location is in or approaching a restricted area, and
        a wireless transmitter adapted to transmit the signal; and
    a stimulator adapted to be worn by the animal, the stimulator including
        a stimulation component adapted to deliver a corrective stimulus in response to the signal.

2. The apparatus as set forth in claim 1, wherein the stimulator further includes a second processor operable to receive the signal and communicate stimulus information to the stimulation component.

3. The apparatus as set forth in claim 1, wherein the locator further includes a GPS receiver adapted to receive satellite signals from a plurality of orbiting satellites and to communicate the signals to the first processor.

4. The apparatus as set forth in claim 1, wherein the wireless transmitter is an ultrasonic transmitter.

5. The apparatus as set forth in claim 4, wherein the stimulator further comprises an ultrasonic receiver adapted to receive the signal transmitted by the ultrasonic transmitter.

6. The apparatus as set forth in claim 5, wherein the wireless transmitter and the wireless receiver include ceramic resonators.

7. The apparatus as set forth in claim 1, wherein the first processor is further adapted to encode the signal and the second processor is further adapted to decode the signal.

8. The apparatus as set forth in claim 1, wherein the second processor is further adapted to determine a type of stimulus.

9. The apparatus as set forth in claim 1, wherein the locator further includes a first memory element adapted to store restricted area information and stimulus information.

10. The apparatus as set forth in claim 9, wherein the first processor is further adapted to implement a stimulation limit function based on the stimulus information.

11. The apparatus as set forth in claim 10, wherein the stimulus information is a stimulation history.

12. The apparatus as set forth in claim 1, wherein the stimulation component further includes a stimulation circuit adapted to deliver a corrective stimulus to the animal.

13. The apparatus as set forth in claim 12, wherein the stimulation circuit further includes an electric component and an acoustic component.

14. The apparatus of claim 1, wherein the stimulator further includes a memory element adapted to store stimulus information.

15. The apparatus as set forth in claim 14, wherein the second processor is further adapted to implement a stimulation limit function based on the stimulus information.

16. The apparatus as set forth in claim 15, wherein the stimulus information is a stimulation history.

17. The apparatus as set forth in claim 1, wherein the locator is adapted to attach to a collar.

18. The apparatus as set forth in claim 1, wherein the stimulator is adapted to attach to an ear of the animal.

19. An animal control apparatus comprising:
    a locator adapted to be worn by the animal, the locator including
        a GPS receiver adapted to receive satellite signals from an array of orbiting satellites,
        a first processor adapted to determine location information based on the satellite signals and to generate a stimulation request, and
        an ultrasonic transmitter adapted to receive the stimulation request and to transmit a corresponding ultrasonic signal; and
    a stimulator adapted to be worn by the animal, the stimulator including
        an ultrasonic receiver adapted to receive the ultrasonic signal,
        a second processor adapted to receive the ultrasonic signal from the ultrasonic receiver, determine a type of stimulus, and communicate a stimulation delivery signal to the stimulation component, and
        a stimulation component coupled with the ultrasonic receiver and adapted to generate and to deliver a corrective stimulus in response to the ultrasonic signal.

20. The apparatus as set forth in claim 19, wherein the locator further includes a first memory element adapted to store restricted area information and stimulus information.

21. The apparatus as set forth in claim 20, wherein the stimulator further includes a memory element adapted to store stimulus information.

22. The apparatus as set forth in claim 21, wherein the first processor is further adapted to encode the stimulation request signal and the second processor is further adapted to decode the stimulation request signal.

23. The apparatus as set forth in claim 22, wherein the first processor is further adapted to communicate stimulus information to the first memory element.

24. The apparatus as set forth in claim 23, wherein the second processor is further adapted to communicate stimulus information to the second memory element.

25. An animal control apparatus comprising:
   a locator adapted to attach to a collar, the locator including
      a GPS receiver adapted to receive satellite signals from an array of orbiting satellites,
      a first memory element adapted to store restricted area information and stimulus information,
      a first processor adapted to determine a geographic location based on the satellite signals, receive restricted area information from the first memory element, compare the location with the restricted area information, encode a stimulation request, communicate stimulus information to the first memory element, and communicate the stimulation request to the transmitter, and
      an ultrasonic transmitter adapted to receive the stimulation request and to transmit a corresponding ultrasonic signal using a ceramic resonator, wherein the ultrasonic signal has a range of ten to twenty-five feet; and
   a stimulator adapted to attach to an ear of the animal, the stimulator including
      an ultrasonic receiver adapted to receive the ultrasonic signal using a ceramic resonator,
      a second processor adapted to receive the ultrasonic signal from the ultrasonic receiver, decode the signal, determine a type of stimulus, and communicate a stimulation delivery signal to the stimulation circuit,
      a second memory element adapted to receive stimulus information from the second processor and to store the stimulus information, and
      a stimulation circuit adapted to receive the stimulation delivery signal and to deliver a corrective stimulus to the animal.

26. An animal control apparatus comprising:
   a locator adapted to be worn on a first portion of the animal, the locator including a first processor operable to determine its location and to generate a signal if the location is in or approaching a restricted area; and
   a stimulator adapted to be worn on a second portion of the animal, the stimulator including a stimulation component adapted to deliver a corrective stimulus in response to the signal.

27. The apparatus as set forth in claim 26, wherein the locator further includes a wireless transmitter adapted to transmit the signal.

28. The apparatus as set forth in claim 27, wherein the stimulator further includes a second processor operable to receive the signal and communicate stimulus information to the stimulation component.

29. A method of controlling a group of animals, the method comprising the steps of:
   (a) attaching a locator to a first animal of the group;
   (b) attaching a stimulator to each animal of the group;
   (c) determining a location of the locator; and
   (d) communicating an ultrasonic signal from the locator to the stimulators if the location is in a restricted area, wherein the signal carries stimulus information.

30. The method as set forth in claim 29, wherein the locator includes a GPS receiver and a memory element adapted to store information relating to a restricted area.

31. The method as set forth in claim 30, further comprising the steps of:
   (e) attaching the locator to a collar of the first animal; and
   (f) attaching a stimulator to an ear of each animal of the group.

32. The method as set forth in claim 31, further comprising the step of:
   (g) determining if the location is within a restricted area by comparing the location with the restricted area information.

33. The method as set forth in claim 32, further comprising the steps of:
   (h) determining if a secondary stimulation limit has been reached; and
   (i) communicating an ultrasonic signal from the locator to the stimulators when the location is within the restricted area and the secondary stimulation limit has not been reached, wherein the signal carries stimulus information.

34. The method as set forth in claim 33, further comprising the steps of:
   (j) determining if a primary stimulation limit has been reached; and
   (k) delivering a corrective stimulus to the animals via the stimulators if the primary stimulation limit has not been reached.

35. A method of controlling a group of animals, the method comprising the steps of:
   (a) attaching a locator to a collar of a first animal of the group, wherein the locator includes a GPS receiver and a memory element adapted to store information relating to a restricted area;
   (b) attaching a stimulator to an ear of each animal of the group;
   (c) determining a location of the locator;
   (d) determining if the location is within a restricted area by comparing the location with the restricted area information;
   (e) determining if a secondary stimulation threshold has been reached;
   (f) communicating an ultrasonic stimulation signal from the locator to the stimulators when the location is within the restricted area and the secondary stimulation limit has not been reached;
   (g) determining if a primary stimulation limit has been reached; and
   (e) delivering a corrective stimulus to the animals via the stimulators if the primary stimulation limit has not been reached.

* * * * *